May 19, 1931.  J. E. HOVERMALE  1,805,582
BEET HARVESTER
Filed Feb. 8, 1929  4 Sheets-Sheet 1
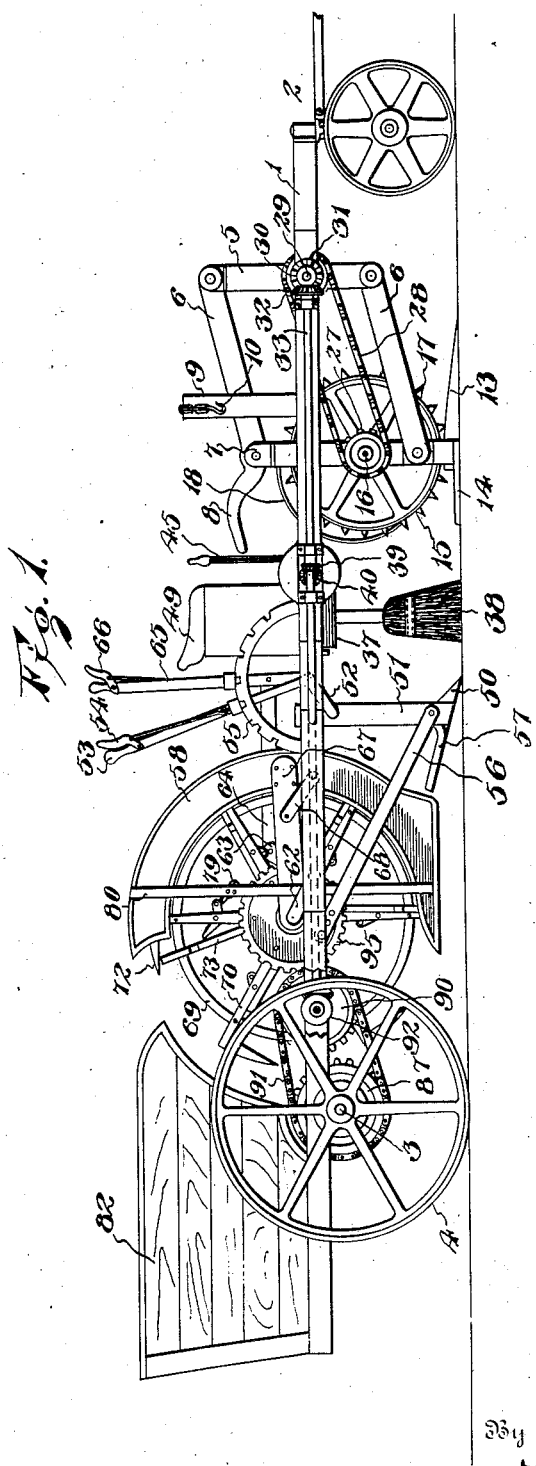
Inventor
J. E. Hovermale
By
Lacey & Lacey, Attorneys May 19, 1931.  J. E. HOVERMALE  1,805,582
BEET HARVESTER
Filed Feb. 8, 1929   4 Sheets-Sheet 2
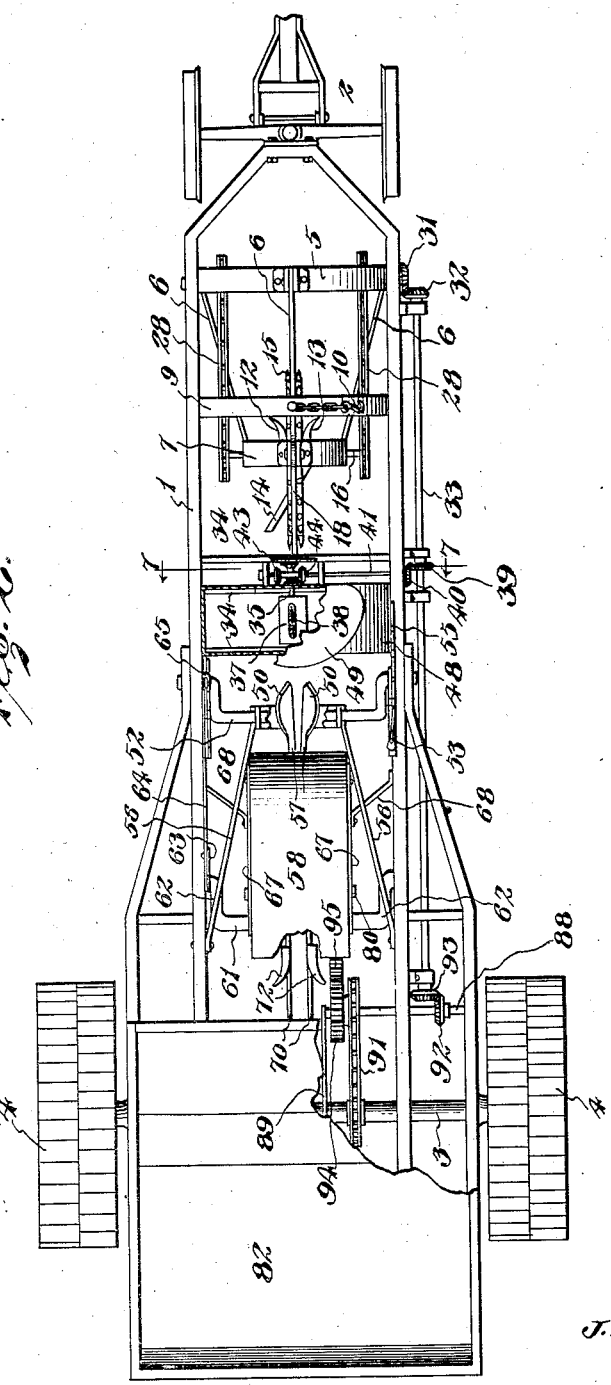
Inventor
J. E. Hovermale
By Lacey & Lacey, Attorneys

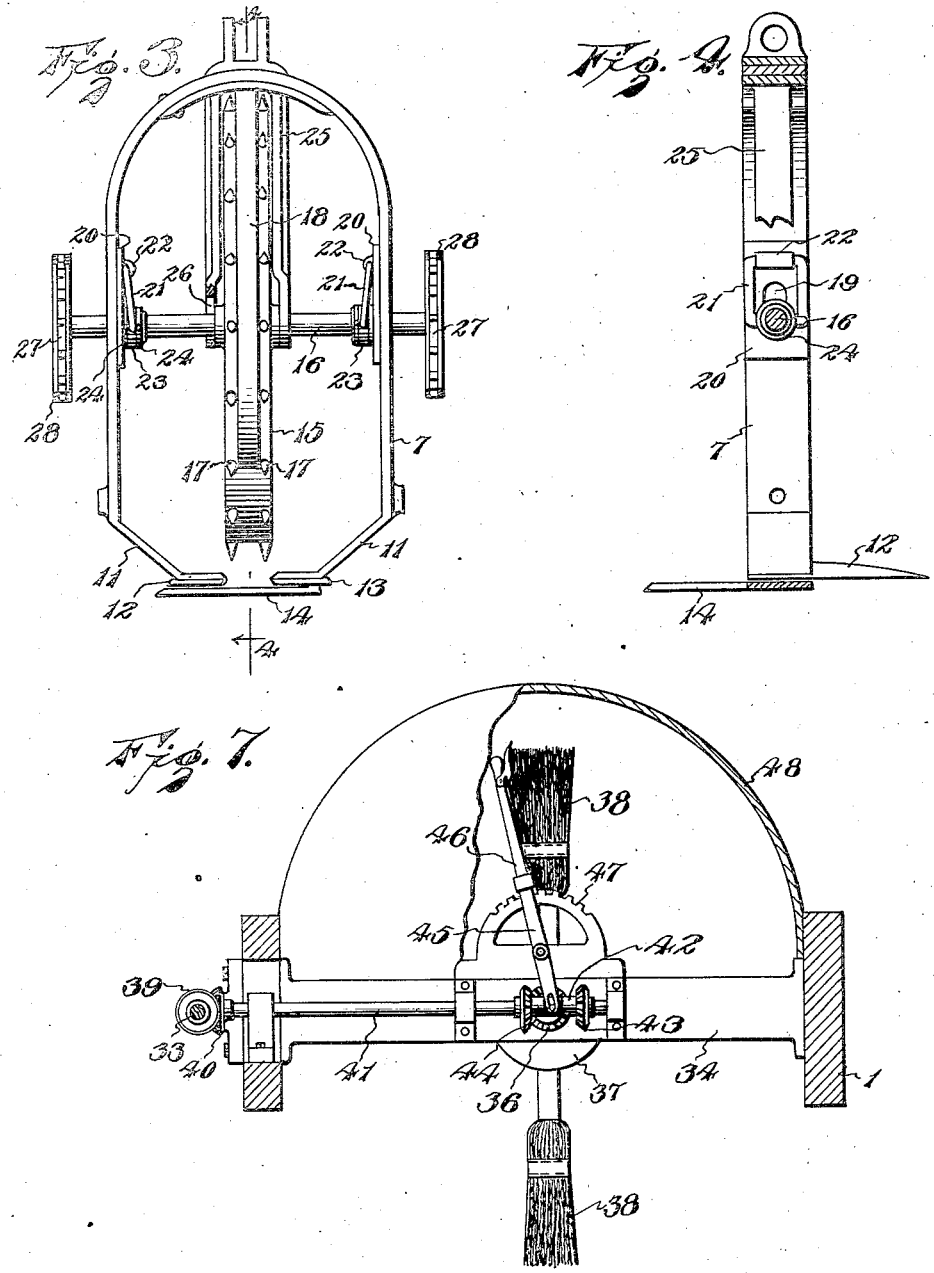

May 19, 1931.  J. E. HOVERMALE  1,805,582
BEET HARVESTER
Filed Feb. 8, 1929  4 Sheets-Sheet 4
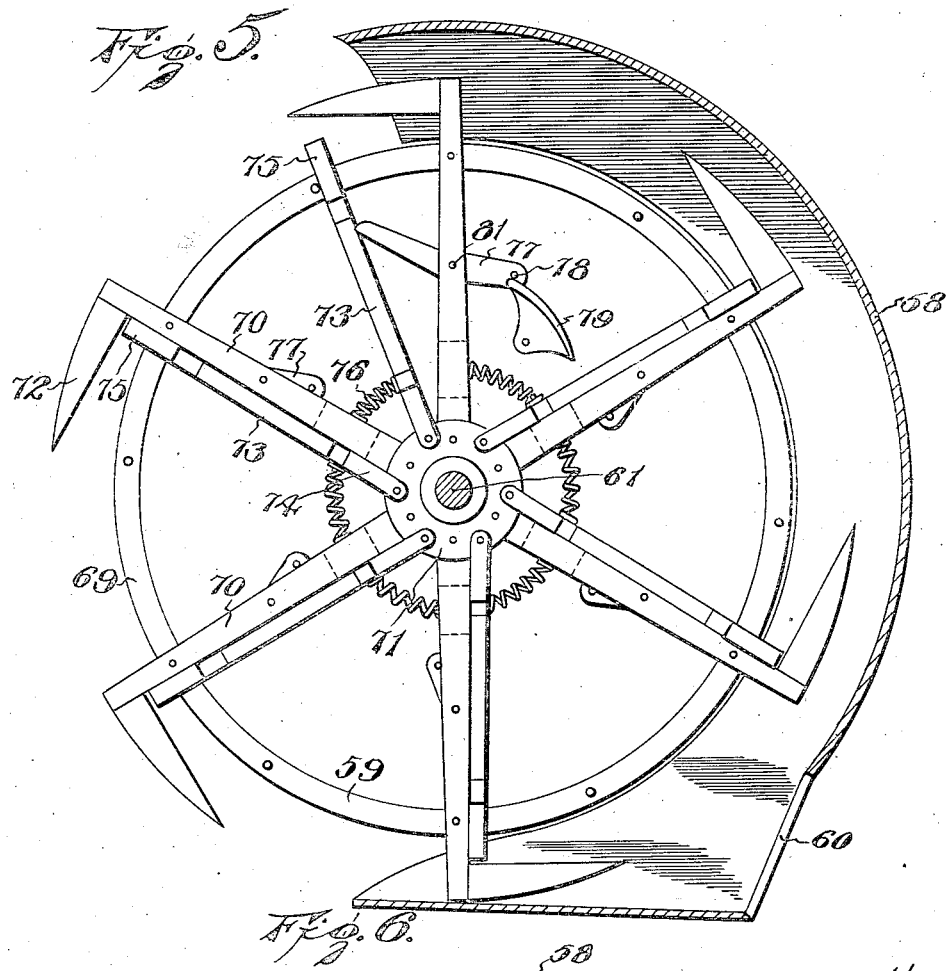
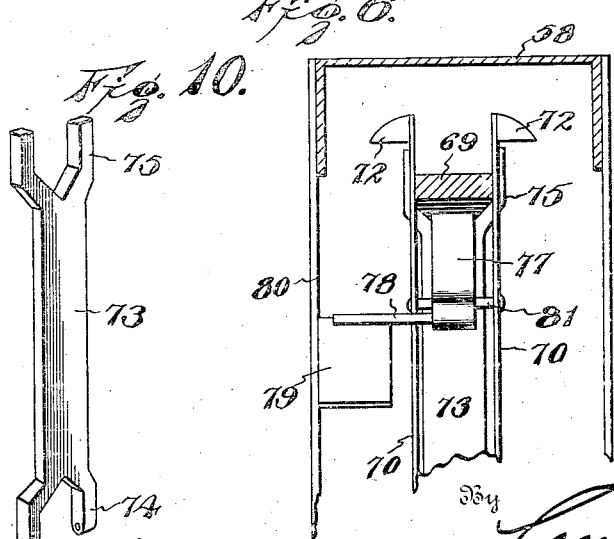
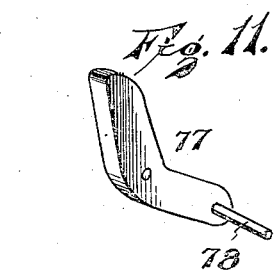

Patented May 19, 1931

1,805,582

UNITED STATES PATENT OFFICE

JAMES E. HOVERMALE, OF SAN QUENTIN, CALIFORNIA

BEET HARVESTER

Application filed February 8, 1929. Serial No. 338,540.

This invention relates to beet harvesters and has for its object the provision of a machine by the operation of which, as it is drawn over a field, the tops of the beets will be removed and the topped beets will be then lifted from the ground and deposited in a receptacle at the rear end of the machine. The invention provides a machine which may be easily adjusted to operate at a desired depth and in which all the working elements will be driven from the rear ground wheels of the machine. The machine also includes means whereby the topper will be automatically adjusted to the size of a beet and the tops held firmly in position to be acted upon by the knife, and also includes means whereby the beet bodies free of the tops will be taken from the lifter or digger and discharged singly into the receptacle provided for the accumulation of a load. Other objects and features of the invention will appear incidentally in the course of the following description, and the invention resides in certain novel features which will be particularly pointed out in the appended claims.

In the accompanying drawings which illustrate one form of the invention;

Figure 1 is a side elevation of the beet harvester;

Fig. 2 is a plan view of the same, partly broken away and partly in horizontal section;

Fig. 3 is an enlarged rear elevation of the topper;

Fig. 4 is a vertical section on the line 4—4 of Fig. 3, the gage wheel being omitted;

Fig. 5 is an enlarged sectional elevation of the beet-elevating and ejecting means;

Fig. 6 is a transverse section of a portion of the elevating means;

Fig. 7 is an enlarged transverse section on the line 7—7 of Fig. 2;

Fig. 8 is a detail of the load receptacle;

Fig. 9 is a detail plan view of the topper, and

Figs. 10 and 11 are details of elements of the ejecting means.

In building a machine according to my invention, there is provided a main frame 1 which is substantially an oblong and is supported at its front end by a truck 2 so constructed that the wheels thereof may run at opposite sides of the row of beets and it may be moved pivotally laterally so that the machine may be easily steered. Near the rear end of the main frame, an axle 3 is provided and this axle carries ground wheels 4 having their rims suitably constructed to obtain efficient tractive engagement with the surface of the ground.

Adjacent the front end of the main frame, an arch or yoke 5 is secured thereto so as to span the same and to this yoke are pivoted the front ends of links or arms 6, one of said links or arms being attached at the top of the yoke and in the central longitudinal line of the same while the other links are attached at opposite sides of the yoke near the bottom thereof. These several links 6 extend rearwardly and have their rear ends pivoted to a yoke or arched frame 7 which is substantially inverted U-shape and has resilient sides. As shown clearly in Fig. 1, the upper central link 6 extends rearwardly beyond the arched topper frame 7 and is formed into a handle member 8 whereby the topper frame may be raised when the beets are not to be topped and, in order that the frame may be supported in its raised position, a cross bar or yoke 9 is secured upon the main frame in advance of the vertical plane of the topper frame and equipped with a hook 10 which may be engaged with the handle 8 in an obvious manner. The lower extremities of the inverted U-shaped topper frame 7 are converged downwardly, as shown most clearly at 11 in Fig. 3, and to the said extremities are secured shoes or top pick-up devices 12 and 13 which are adapted to run at opposite sides of the row of beets and pass under the tops of the plants so as to raise the tops and gather them into a bunch immediately over the respective beet bodies. As shown most clearly in Fig. 9, the shoes 12 and 13 are tapered forwardly and diverge so that they will readily pass under the fallen tops and lift the same from the ground and also cause them to be directed toward the central line of the machine and properly bunched. The shoes are formed in rights and lefts, as shown in Fig. 9, and the right hand shoe 13 has a cutting blade 14 secured to its rear end and so disposed as to extend across the row of beets obliquely whereby it will be brought by the travel of the machine against the beets and drawn through the same to cut the crown from the beet body with the bunched tops as is the customary practice. The oblique disposition of the knife permits trash to pass to one side so that it will be out of the way and will not accumulate to clog the action. Mounted within the topper frame 7 is a central gage wheel 15 which is carried by a shaft 16, extending through the sides of the frame, and is equipped upon its periphery with two annular rows of teeth or spurs 17 which are adapted to engage the tops of the beets and throw them to the rear of the knife after they are cut. A scraper 18 is secured to the top of the frame 7 and projects rearwardly and downwardly therefrom so as to bear against the periphery of the wheel 15 between the rows of teeth 17 and thereby scrape from the wheel any tops or leaves which may tend to cling thereto, it being understood that this scraper is a leaf spring of suitable form and size. The shaft 16 extends through vertical slots 19 provided in the sides of the frame 7, and reinforcing plates or brackets 20 are secured to the inner surfaces of the sides of the frame to reinforce it around the slots. Hanger loops 21 are suspended upon the frame above the slots 19 and may rock or oscillate in their bearings 22 in an obvious manner, the lower ends of the hangers being engaged in collars 23 loose upon the shaft 16 and held against endwise movement thereon by stop collars 24 secured to the shaft and arranged at opposite sides of the bearing collar 23. A hanger bracket 25 is secured to the top of the frame and depends therefrom, said bracket consisting of a pair of side arms having vertical slots 26 in their lower end portions corresponding to the slots 19 and receiving the shaft 16, as will be understood upon reference to Fig. 3, it being understood that the wheel 15 is secured to the shaft between the lower ends of the bracket arms. It will be understood that the gage wheel 15 is designed to ride over the beet tops simultaneously with the bunching of the tops by the shoes 12 and 13 and automatically adjust the knife so that it will cut the beet at the proper point. Should the beet have a heavy top and crown it will naturally be of large diameter; the shoes 12 and 13 will be spread somewhat by their engagement with the sides of such beet and this spreading action will be accommodated by the resilient quality of the frame 7. At the same time the wheel 15 will tend to rise because the beet tops will be abnormally thicker and heavier so as to assume a higher position relative to the knife and permit the latter to cut more from the crown, as is required with large beets, the relative movement of the wheel and the shoes being accommodated by the slots 19 and 26 and the hanger loops 21, as will be understood. The shaft 16 is positively rotated and for this purpose sprockets 27 are secured upon the ends of the shaft and chains 28 are trained around the sprockets. A transverse shaft 29 is mounted in the main frame 1 and in the yoke 5 and this shaft has sprockets 30 secured thereon in alinement with the sprockets 27, the chains 28 being trained about the sprockets 30 in an obvious manner so that rotation of the shaft 29 will be imparted to the shaft 16. Upon one end of the shaft 29 is secured a beveled gear 31 which meshes with a similar beveled gear 32 on the front end of a line shaft 33 which is mounted in suitable bearings provided therefor on the side of the main frame and is driven from the rear ground wheels 4 through mechanism which will be hereinafter fully described.

At the rear of the topper mechanism, cross bars 34 are secured to the main frame, and these cross bars carry bearings in which is mounted a brush shaft 35 having a gear 36 secured thereon. The shaft 35 is formed with or has secured thereon a head or cylindrical body 37 from which radially extend brushes or brooms 38 which are thereby adapted to operate transversely of the machine and sweep the severed tops to one side. Secured upon the line shaft 33 is a bevel gear 39 meshing with a similar gear 40 on the outer end of a transmission shaft 41 which is supported by the main frame and cross bars 34. On the inner end portion of the shaft 41 is a sleeve 42 which may slide thereon but is constrained to rotate therewith and carries opposed beveled gears 43, 44 either of which may mesh with the gear 36 on the brush shaft. A hand lever 45 is mounted on the front cross bar 34 and is operatively connected with the sleeve 42 to shift the same and thereby cause either the pinion 43 or the pinion 44 to engage the gear 36 accordingly as the broom is to be rotated in one or the other direction. The lever is equipped with the usual latch 46 cooperating with a holding rack or segment 47 whereby the lever may be held in a set position. It will now be clear that, if the lever be adjusted as shown in Fig. 7, the brush shaft will be rotated in one direction and the tops will be swept to one side of the machine, whereas, if the lever be shifted to the opposite side, the brush shaft will rotate in the opposite direction, and if the lever be set in a central position the brush will be inactive. This reversibility of the brush is advantageous inasmuch as when the machine reaches the end of a row and is turned to make a return trip over the field, the direction of rotation of the brush shaft may be reversed and the severed tops will then be swept onto the same line as the previously severed tops and the labor of subsequently gathering the tops will be cut in half.

A cover 48 is secured upon the main frame to extend over the brushes or brooms and it may be of any approved form, but it should be of sufficient rigidity to support a seat 49 for the operator.

The topped beets are withdrawn from the ground by a pair of diggers or lifting blades 50 which are arranged to run directly at the rear of the brushes and in the central longitudinal line of the machine so that they will pass at opposite sides of the beets and efficiently engage the same. These diggers or lifters are spaced apart at their front ends a greater distance than at their rear ends and they are inclined upwardly and rearwardly, as shown in Fig. 1, so that as they are drawn against and pass the beet they will exert a wedging action thereon which will quickly and easily withdraw it from the soil. The diggers may, of course, be set to run at any desired depth and for this purpose they are secured to the lower ends of hangers 51 which are hung upon the bowed portion of a crank shaft 52 having its ends journaled in the side bars of the main frame and having a hand lever 53 firmly secured to one end thereof. This hand lever may be easily reached from the seat 49 and it is equipped with a latch 54 cooperating with a holding rack 55 on the side of the frame, as shown in Fig. 1 and as will be understood. In order that the hangers may be held against swaying movement and the diggers, therefore, held properly to their work, push bars 56 are pivoted at their front ends to the respective hangers and have their rear ends pivotally attached to the sides of the main frame. The connection of the rear end of the push bars with the frame may be of any desirable type so that the bars will be caused to accommodate the relative angular movement of the diggers but at the same time will be maintained with sufficient rigidity to hold the diggers to the work. The diggers are elongated rearwardly so as to form supporting fingers 57 which guide the lifted beets into an elevator casing 58 which is supported upon the main frame and is a substantially semi-circular hood extending around the front portion of an elevator wheel 59 and provided in its front side at its lower end with an opening 60 through which the beets will be delivered by the fingers 57. The elevator wheel is carried by a shaft 61 having cranked ends 62 journaled in the side bars of the main frame and to one cranked end of the shaft there is secured a crank arm 63 (see Fig. 1) having pivoted to its free end the rear end of a connecting bar 64 which extends forwardly and is pivoted to a hand lever 65 fulcrumed upon the main frame and equipped with the usual latch, indicated at 66, whereby it may be held in a set position. It will be understood that the elevator wheel is loose upon the shaft 61 and by rocking the hand lever 65 forwardly or rearwardly the shaft will be swung about its cranked ends so that the elevator will be set at a higher or lower level and maintained in proper operative relation to the diggers. The casing 58 must, of course, be maintained in concentric relation to the elevator wheel at all times and for this purpose I secure to the sides of the casing carrying arms 67 which have their rear ends loosely engaged about the shaft 61, and links 68 are pivoted at their upper rear ends to the arms 67 and at their lower forward ends to the sides of the main frame, the working length of the links 68 being the same as the cranks 62 of the shaft 61 and the links being at all times in parallel relation to the cranks so that when the elevator wheel is shifted in the manner described the casing will be simultaneously shifted to the same extent and in the same direction. The elevator wheel comprises a rim 69 and spokes 70 supporting the rim from a hub member 71 which encircles the shaft 61. The spokes extend radially beyond the rim, as shown clearly in Figs. 1 and 5, and to the extremities of the spokes are secured grippers 72 which project forwardly in the direction of rotation of the wheel and are arranged in pairs, as will be understood on reference to Figs. 2 and 6. As the wheel rotates, the pairs of grippers will be brought successively into engagement with the beet bodies deposited in the lower end of the casing 58 and will then be carried around, up and over with the wheel, it being noted that the grippers are in the form of diverging tapered elements whereby they will readily pass at the opposite sides of a beet body and easily grip the same so as to hold the body until it is discharged at the top of the wheel. To effect discharge of a gripped beet, I provide an ejector upon each pair of spokes, each ejector comprising a shank 73 having forked ends, its inner end 74 spanning and being pivoted to the hub while its outer end 75 spans the rim, the shank normally lying against the adjacent spoke and being held thereto by a spring 76, as shown clearly in Fig. 5. A kicker dog 77 is pivotally supported by and between each pair of spokes and has its outer end bearing against the shank 73 while its inner end is equipped with a lateral pin 78 adapted to ride against and be actuated by a tripper 79 in the form of an eccentric or cam block secured upon the frame bar 80 which braces and supports the elevator casing. The outer end 75 of the shank projects radially beyond the rim 69 sufficiently to engage a beet supported by the rim and the grippers. Normally the ejector is held close to the front of the spoke immediately at the rear of the grippers by the respective spring 76 which is between the ejector shank and the preceding spoke, as shown clearly in Fig. 5. The ejector will be inactive until the pin 78 impinges against the stationary tripper 79, whereupon the inner end of the dog will be retarded relative to the wheel and the dog will be caused to swing about its pivotal support 81 so that its outer extremity will be swung forwardly against the ejector and the latter will be sharply rocked and drive the beet body from between the grippers.

The receptacle 82 may be of any preferred dimensions but its front wall should be disposed close to the path of the grippers and left open in its upper portion, as indicated at 83 in Fig. 8, whereby the beet bodies which are ejected from the grippers successively will be caused to pass into the receptacle. The lower front corner of the receptacle is preferably arcuate in form, as shown at 84, whereby it will accommodate the gearing which will be presently described. The bottom 85 of the receptacle is hinged at its front edge, as indicated at 86, so that, when desired, the gathered load may be easily dumped. Any convenient form of latch may be provided to hold the dumping bottom normally locked in raised position.

A sprocket gear 87 is secured upon the rear axle 3 and in advance of the axle a counter-shaft 88 is supported by the main frame and a bar 89 provided for that purpose between the sides of the frame. A sprocket 90 is secured upon the counter-shaft 88 and a chain 91 is trained about the sprockets 87 and 90 so that the counter-shaft will be driven directly from the axle and in the same direction. Near the outer end of the counter-shaft, a beveled pinion 92 is secured thereon and this pinion meshes with a similar pinion 93 on the rear end of the line shaft 33 so that the said shaft will be rotated to actuate the gage wheel 15 and the brush through the previously described trains of gearing. Fixed upon the shaft 88 or to the side of the sprocket 90 is a spur gear 94 which meshes with a gear 95 fixed in any desired manner to the side of the elevator wheel 59, the elevator wheel being thus driven so as to rotate in opposition to the ground wheels and consequently properly engage and take up the lifted beet bodies.

From the foregoing description, taken in connection with the accompanying drawings, it will be seen that I have provided a very efficient and compact machine which will operate under light draft to remove beet tops, brush the severed tops away from the bodies, and then lift the bodies and deliver them into a receptacle where a load may accumulate. The topping mechanism will automatically accommodate itself to the varying sizes of the beets and may be lifted entirely clear thereof when the machine is to be drawn from field to field. The diggers and the elevator mechanism may likewise be easily adjusted to run at a desired depth or lifted clear of the ground when the operation of the parts is not desired.

Having thus described the invention, I claim:

1. In a beet harvester, the combination of a main frame, an arched topper frame carried by the main frame, shoes carried by the lower ends of the topper frame to run at opposite sides of a row of beets, a knife secured to one of said shoes and extending obliquely rearwardly therefrom across the path of the other shoe at the rear of the latter, and a wheel mounted in the topper frame for relative vertical movement to engage the beet tops between the shoes.

2. In a beet harvester, the combination of a main frame, a topper frame supported in the main frame for vertical movement and comprising resilient sides, beet-engaging shoes carried by the lower ends of the sides of the topper frame, a knife secured to one of said shoes and extending obliquely across the paths of the shoes at the rear of the shoes, a hanger within the topper frame, said hanger and the sides of the topper frame being provided with vertical slots, a shaft extending through said slots, means carried by the main frame for rotating said shaft, a wheel secured upon said shaft between the sides of the hanger, hanger loops mounted on the inner sides of the topper frame above the slots therein, bearing collars carried by the lower ends of the hangers and encircling the shaft, and stop collars secured to the shaft at opposite sides of said bearing collars.

3. In a beet harvester, the combination of a main frame, an inverted U-shaped topper frame carried by the main frame, the sides of said topper frame being resilient whereby to approach or recede according to the diameter of an engaged beet, shoes carried by the lower ends of the topper frame to engage opposite sides of beet bodies, a knife extending rearwardly from one of the shoes to sever the beet tops, a gage wheel to run upon the beet tops, and auxiliary hangers suspending the wheel in the topper frame and imparting relative vertical movement thereto as the sides of the topper frame approach or recede.

In testimony whereof I affix my signature.

JAMES E. HOVERMALE. [L. S.]